US012502821B2

(12) United States Patent
Pasquier et al.

(10) Patent No.: US 12,502,821 B2
(45) Date of Patent: Dec. 23, 2025

(54) DEVICE AND METHOD FOR THE THERMAL CONDITIONING OF PREFORMS

(71) Applicant: SIDEL PARTICIPATIONS, Octeville-sur-Mer (FR)

(72) Inventors: Hervé Pasquier, Octeville-sur-Mer (FR); Sébastien Fevre, Octeville-sur-Mer (FR)

(73) Assignee: SIDEL PARTICIPATIONS, Octeville-sur-Mer (FR)

( * ) Notice: Subject to any disclaimer, the term of this patent is extended or adjusted under 35 U.S.C. 154(b) by 397 days.

(21) Appl. No.: 17/784,352

(22) PCT Filed: Dec. 7, 2020

(86) PCT No.: PCT/EP2020/084866
§ 371 (c)(1),
(2) Date: Jun. 10, 2022

(87) PCT Pub. No.: WO2021/116013
PCT Pub. Date: Jun. 17, 2021

(65) Prior Publication Data
US 2023/0053117 A1 Feb. 16, 2023

(30) Foreign Application Priority Data

Dec. 11, 2019 (FR) ...................................... 1914131

(51) Int. Cl.
*B29C 49/68* (2006.01)
*B29C 49/64* (2006.01)
(Continued)

(52) U.S. Cl.
CPC ........ *B29C 49/681* (2022.05); *B29C 49/6418* (2013.01); *B29C 49/6435* (2022.05);
(Continued)

(58) Field of Classification Search
CPC ......... B29C 49/68; B29C 49/64; B29C 49/06; B29C 49/78; B29C 49/6435;
(Continued)

(56) References Cited

U.S. PATENT DOCUMENTS

| 6,632,087 B1 * | 10/2003 | Armellin | H05B 3/0057 425/526 |
| 7,448,866 B2 * | 11/2008 | Doudement | B29C 49/68 425/526 |
| 7,553,156 B2 * | 6/2009 | Doudement | B29C 49/68 425/526 |
| 8,257,073 B2 * | 9/2012 | Quetel | B29C 49/68 425/73 |

(Continued)

FOREIGN PATENT DOCUMENTS

| BR | 9611690 A * | 6/1999 | ......... B29C 49/6418 |
| CA | 2150898 A1 | 12/1995 | |

(Continued)

OTHER PUBLICATIONS

International search report dated Jan. 28, 2021.

*Primary Examiner* — Gregory A Wilson
(74) *Attorney, Agent, or Firm* — Blake T. Hudson; Stephanie L. Davy Jow (57) ABSTRACT

A thermal conditioning device for thermally conditioning preforms, comprising a heating module provided with an enclosure with a transport volume for said preforms; a heating means and a cooling means that are oriented toward the volume; a control means for controlling said heating and cooling means; said cooling means comprising a circulating means for circulating a flow of air with a nominal flow rate determined by said control means; a channel between said circulating means and said enclosure and leading toward said volume; wherein it comprises, along said channel, a measuring means for measuring the actual flow rate and an adjusting means for adjusting said nominal flow rate with respect to said actual flow rate, by controlling the control means. The invention also relates to a corresponding thermal conditioning method.

13 Claims, 5 Drawing Sheets

(51) Int. Cl.
  *B29C 49/78* (2006.01)
  *B29K 667/00* (2006.01)
  *B29L 31/00* (2006.01)

(52) U.S. Cl.
  CPC ........ *B29C 49/682* (2022.05); *B29C 49/6835* (2022.05); *B29C 49/685* (2022.05); *B29C 49/786* (2013.01); *B29C 2049/7867* (2022.05); *B29K 2667/003* (2013.01); *B29L 2031/7158* (2013.01)

(58) Field of Classification Search
  CPC ..... B29C 49/6409; B29K 67/00; B29L 31/00; B29L 2031/7158
  See application file for complete search history.

(56) References Cited

U.S. PATENT DOCUMENTS

```
10,493,686  B2 *  12/2019  Derrien ............... F27D 15/0206
11,173,647  B2 *  11/2021  Hayakawa ............. A61L 2/208
2010/0136160 A1    6/2010  Quetel
2011/0300497 A1   12/2011  Derrien
```

FOREIGN PATENT DOCUMENTS

```
EP          0564354  A1 *  10/1993
EP          2392442  A1    12/2011
JP         S6137214  B2 *   8/1986
JP         H06316421 A  *  11/1994
WO     WO-2010012646 A1 *   2/2010  ......... B29C 49/6445
WO     WO-2015185753 A1 *  12/2015  ......... B29C 49/6409
```

\* cited by examiner

DEVICE AND METHOD FOR THE THERMAL CONDITIONING OF PREFORMS

CROSS REFERENCE TO RELATED APPLICATION

This application is a 371 U.S. National Stage Entry Patent Application of International Patent Cooperation Treaty (PCT) Patent Application No. PCT/EP2020/084866 filed 10 Dec. 7, 2020, which claims priority to French Patent Application No. 1914131 filed Dec. 11, 2019, the entireties of which are hereby incorporated herein by reference for all purposes.

BACKGROUND

The present invention lies in the field of the manufacture of containers made of plastics material, which are obtained by transforming preforms by means of a blow-molding operation.

Preferably, but without this being limiting, the plastics material may be PET (polyethylene terephthalate).

A container takes the form of a bottle or a vial, made of plastics material, which is rigid or semi-rigid. This container is intended to serve as a container for a fluid, a liquid, powders or granules, in particular of the agri-foodstuff type, cosmetic type, or dedicated to housekeeping or body hygiene, without this list being exhaustive.

As is known, within an industrial line, the containers can undergo several different successive treatments, ranging from the manufacture of the container by a blow-molding or stretch-blow-molding operation to the packaging in batches of several grouped-together containers, passing in particular via the filling, capping and labeling of individual products. Following these treatments, the products are said to be "finished".

The invention relates most particularly to the step of manufacturing such containers. The manufacture of containers made of plastics material is effected by shaping starting from preforms. A preform comprises a body intended to be shaped topped with a definitive part, provided with a neck and a flange. A preform has a hollow cylindrical shape overall, resembling a test tube.

What is more, the shaping of a container makes use of a pressurized fluid, in particular air, which is blown into the preform, which has been heated in advance and positioned in a mold, in order to apply a plastic deformation until the desired container is obtained, depending on the shape of said mold. A preform has to be heated until a temperature higher than the glass transition temperature of the constituent material, in particular of the body, is obtained by means of a thermal conditioning operation. The invention relates specifically to such thermal conditioning of preforms.

The thermal conditioning is effected by means of a dedicated device, commonly referred to as an "oven". Such an oven generally comprises several independent heating modules, which are arranged end-to-end one after the other, forming a tunnel along which the preforms are transported to be heated. Each module therefore comprises a transport enclosure for said preforms and at least one heating module for heating said enclosure and, from the outside, the preforms passing through it. Such a heating means may be of any type, in particular a, for example infrared, radiation heating means. It may comprise lamps opposite which reflectors are positioned, thus ensuring that the radiation is distributed over the entire periphery of the body of the preform to be heated. In order to ensure that the heat is distributed all the way around, the preforms themselves are generally set in rotation during their transport inside the enclosure.

More precisely, obtention of a temperature gradient in the wall of a preform is sought, such that the temperature of the internal surface is greater than the temperature of the external surface. To this end, it is necessary to cool the outside of the preforms in a controlled manner during their travel through the enclosure. Each module therefore comprises a cooling means for cooling said enclosure that is directed toward the preforms which are transported therein. This cooling is effected by circulating a flow of air, at ambient temperature, collected and filtered from outside the device. In addition, the flows are controlled by controlling fans with which the circulating means is provided.

Document EP 2 392 442 describes an example of a thermal conditioning device, in particular with the fans being controlled by way of variable-speed drives allowing the rotational speed of said fans to be managed. Thus, it is possible to control the nominal flow rate of each fan and of each air flow intended to cool the inside of the enclosure when the preforms are transported therein.

In this context, one problem lies in controlling the nominal flow rate of the cooling air flows, which has to be extremely precise. In particular, over time and during operation thereof, the fans may lose efficiency. Equally, the filters may become clogged. This has the result that the nominal flow rate of the air flow produced by each fan is not maintained, and defects in the containers are frequently observed, after blow molding, at the output of the installation.

BRIEF SUMMARY OF THE INVENTION

The aim of the invention is to remedy the drawbacks of the prior art by proposing to control the nominal flow rate of the air flow with greater precision by verifying the actual flow rate within the channel situated between the circulating means and the enclosure. Thus, in the case of a differential observed by this difference between the flow rate theoretically controlled and the actual flow rate measured, it is possible to adjust the control of the fans in order to correct this potential differential.

To this end, the thermal conditioning device for thermally conditioning preforms comprises
  at least one heating module provided with:
    an enclosure defining at least one transport volume for said preforms;
    at least one heating means oriented toward the transport volume;
    at least one cooling means oriented toward the transport volume;
    at least one control means for controlling at least said heating means and said cooling means;
  said cooling means comprising:
    at least one circulating means for circulating a flow of air with a nominal flow rate;
  said nominal flow rate being determined by said control means of said at least one circulating means;
    at least one channel extending from said circulating means as far as said enclosure and leading toward said transport volume;
  wherein it comprises at least:
    along said channel, at least one measuring means for measuring at least one component of the actual flow rate of said air flow;

an adjusting means for adjusting said nominal flow rate with respect to said actual flow rate, by controlling the control means of said circulating means.

According to additional, non-limiting features, said measuring means may be a speed sensor for said air flow, in particular an anemometer, such as a Pitot tube anemometer or hot-wire anemometer.

Said measuring means may be positioned in a central segment of the length of said channel.

Said cooling means may comprise at least a first channel leading into a first part of the transport volume and a second channel leading into a second part of the enclosure; said circulating means comprising a first ventilation means for ventilating a first flow with a first nominal flow rate toward said first channel and a second ventilation means for ventilating a second flow with a second nominal flow rate toward said second channel;

and wherein said measuring means may be positioned along said first channel;
said adjusting means controlling a first control means of said first ventilation means.

Said thermal conditioning device may comprise:
a second measuring means positioned along said second channel;
a second adjusting means for adjusting said second nominal flow rate with respect to said second actual flow rate, by controlling a control means of said second ventilation means.

The invention also relates to a thermal conditioning method for thermally conditioning preforms, said preforms comprising at least a body, in which method at least:
preforms are transported within a transport volume;
said preforms are heated during their passage through said transport volume;
at least the body of said preforms is cooled by ventilation of at least one air flow with a nominal flow rate from a circulating means toward said enclosure;
the nominal flow rate of said air flow is controlled by controlling said circulating means.

Such a thermal conditioning method is characterized by the fact that it comprises at least the following steps:
at least one component of the actual flow rate of said air flow is measured between said enclosure and said circulating means;
the control of said circulating means is adjusted with respect to said at least one component of said actual flow rate measured.

According to additional, non-limiting features, at least one component of said actual flow rate may be measured by detecting the speed of said air flow.

Furthermore, the invention also makes it possible to detect any malfunctioning of the circulating means, such as aging of the fans or clogging of the filters, in order to output an alert for the purpose of carrying out suitable maintenance.

Other features and advantages of the invention will become apparent from the following detailed description of non-limiting embodiments of the invention.

DETAILED DECRYPTION OF THE INVENTION

The present invention relates to the thermal conditioning of preforms 1, in the context of the manufacture of containers made of plastics material, which are obtained by transforming said preforms 1 by means of a stretch-blow-molding operation. Preferably, but without this being limiting, the plastics material may be of any type, preferably PET (polyethylene terephthalate).

A container takes the form of a bottle or a vial, made of plastics material, which is rigid or semi-rigid. This container is intended to serve as a container for a fluid, a liquid, powders or granules, in particular of the agri-foodstuff type, cosmetic type, or dedicated to housekeeping or body hygiene, without this list being exhaustive. Such containers can undergo several different successive treatments, ranging from the manufacture of the container by a blow-molding or stretch-blow-molding operation starting from preforms 1 to the packaging in batches of several grouped-together containers, passing in particular via the filling, capping and labeling of individual products. In particular, the blow-molding or stretch-blow-molding operation involves thermally conditioning said preforms 1 beforehand.

To this end, one subject of the invention is, first of all, a thermal conditioning device 2 for thermally conditioning preforms 1, hereinafter referred to as "device 2".

Figure 1:
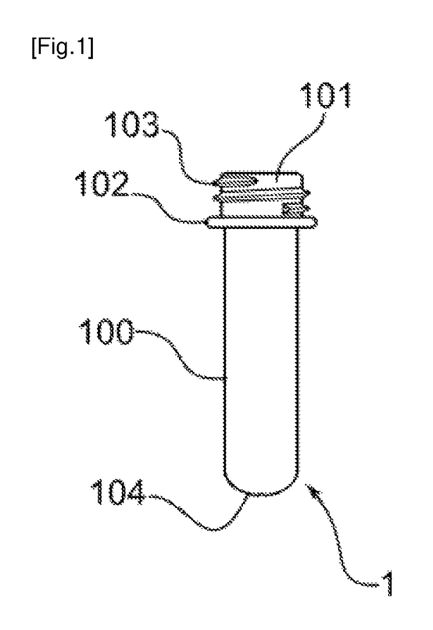
FIG. 1 schematically depicts a simplified side view of a preform.

With reference to FIG. 1, a preform 1 comprises a body 100 intended to be shaped during the blow molding or stretch blow molding. This body 100 comprises a closed base 104 and is topped, on the side opposite to said base 104, by a definitive part, provided with a neck 101 and a flange 102. Furthermore, the neck 101 may comprise an external thread 103 intended to cooperate with a complementary internal thread made within the cap element of the future container. A preform 1 has a hollow cylindrical shape overall, resembling a test tube.

For reasons of legibility of the figures, reference will be made to only the preform 1 in FIGS. 2 to 5.

Figure 2:
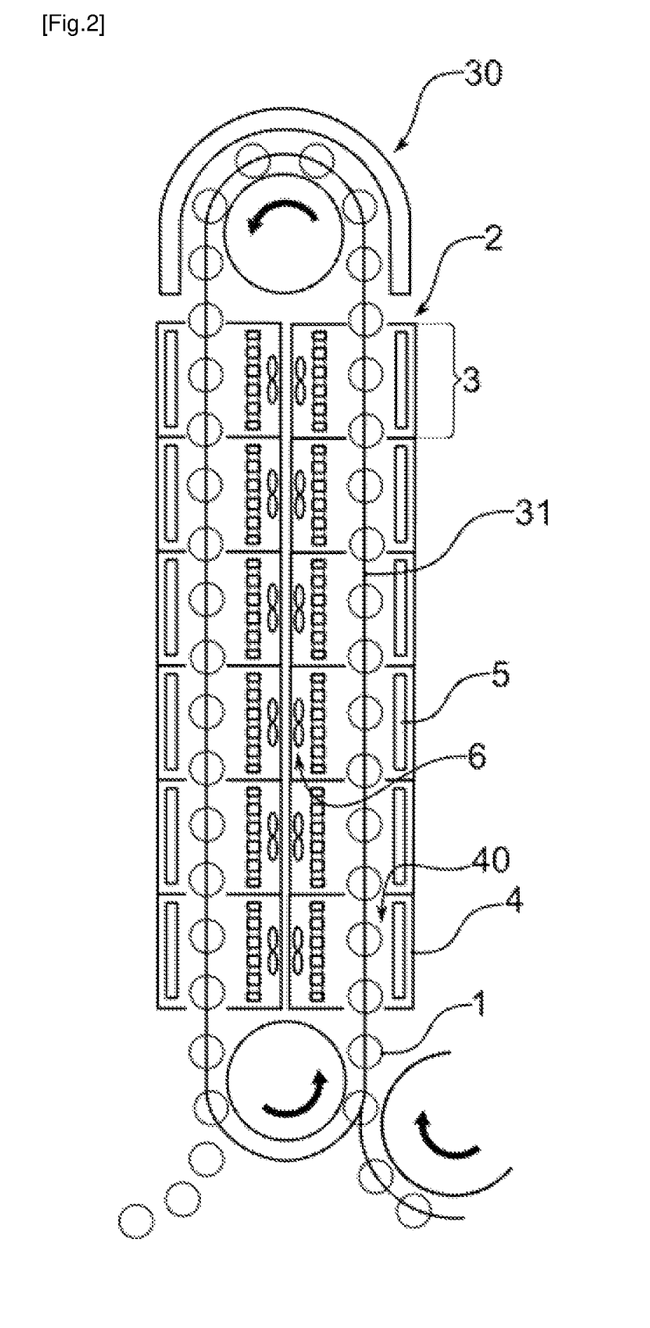
FIG. 2 schematically depicts a simplified view in horizontal median section of an oven for the thermal conditioning of preforms, in particular showing the transport of said preforms inside an enclosure composed of several heating modules arranged end-to-end.

The device 2 comprises at least one heating module 3. Preferably, as can be seen in FIG. 2, the device 2 comprises several heating modules 3 which are arranged next to one another so as to define an oven 30 of the tunnel type. Such an oven 30 heats the preforms 1 that pass through its modules 3 by way of suitable conveying means, in particular in the form of a chain 31. This chain 31 comprises mandrels 32, which are provided to be rotary, forming supports for receiving the preforms 1, in particular by retaining them on the inner wall of their neck 101. Such a mandrel 32 is often called a "spinner". Retained this way on each mandrel 32, a preform 1 turns as it is being conveyed within the oven 30, ensuring homogeneous distribution of the heating all the way around each preform 1.

Said chain 31 travels through the oven 30 along a travel path, an example of which can be seen in FIG. 2, in particular with an outbound path and a return path passing through different heating modules 3.

As such, each heating module 3 heats the preforms 1 according to specific and configurable characteristics.

To this end, each heating module 3 is provided with an enclosure 4 defining at least one transport volume 40 for said preforms 1.

Such a transport volume 40 is therefore passed through by the chain 31 which supports the preforms 1.

Figure 3:
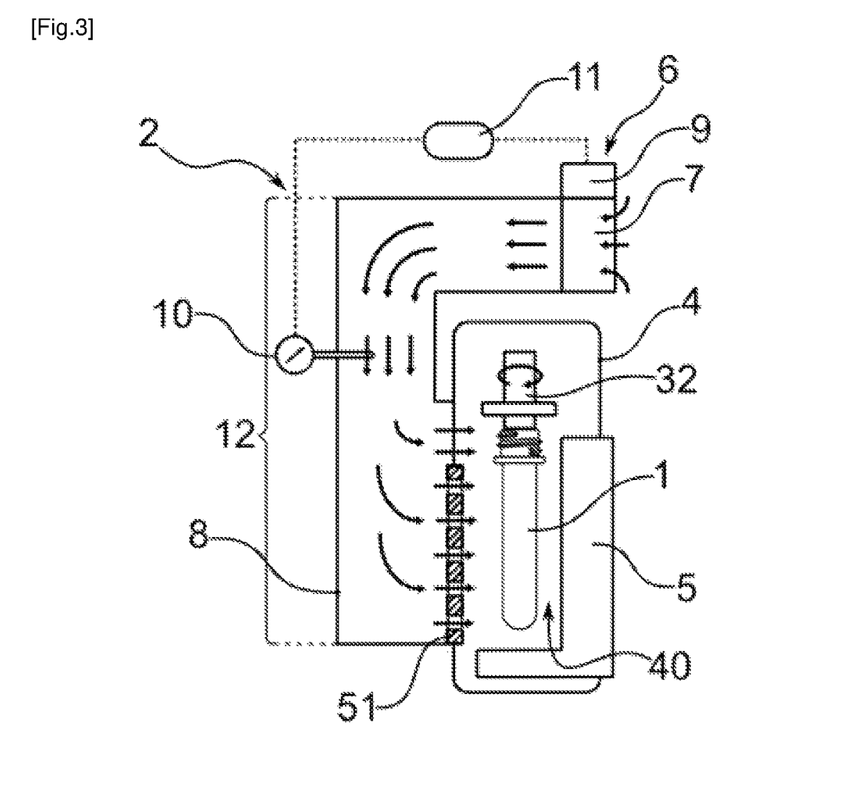
FIG. 3 schematically depicts a simplified view in median section of a generic embodiment of a detail of a conditioning device, in particular showing a single channel connecting a circulating means for circulating a flow of air to the enclosure of said device, with measurement of the flow rate of said air flow close to the outlet of said channel.

According to one possible configuration, as can be seen in FIG. 3, the preforms 1 are transported vertically or substantially vertically, with their neck 101 oriented upward. According to another possible configuration, as can be seen in FIGS. 4 and 5, the preforms 1 are transported vertically or substantially vertically, with their neck 101 oriented downward.

Each heating module 3 also comprises at least one heating means 5 oriented toward the transport volume 40. The heating means 5 heats, by convection, the inside of the volume 40 and the objects located therein, in particular the preforms 1 transported, but also the inner walls of the enclosure 4 and the chain 31 and its mandrels 32.

The heating means 5 may be of any type.

Figure 4:
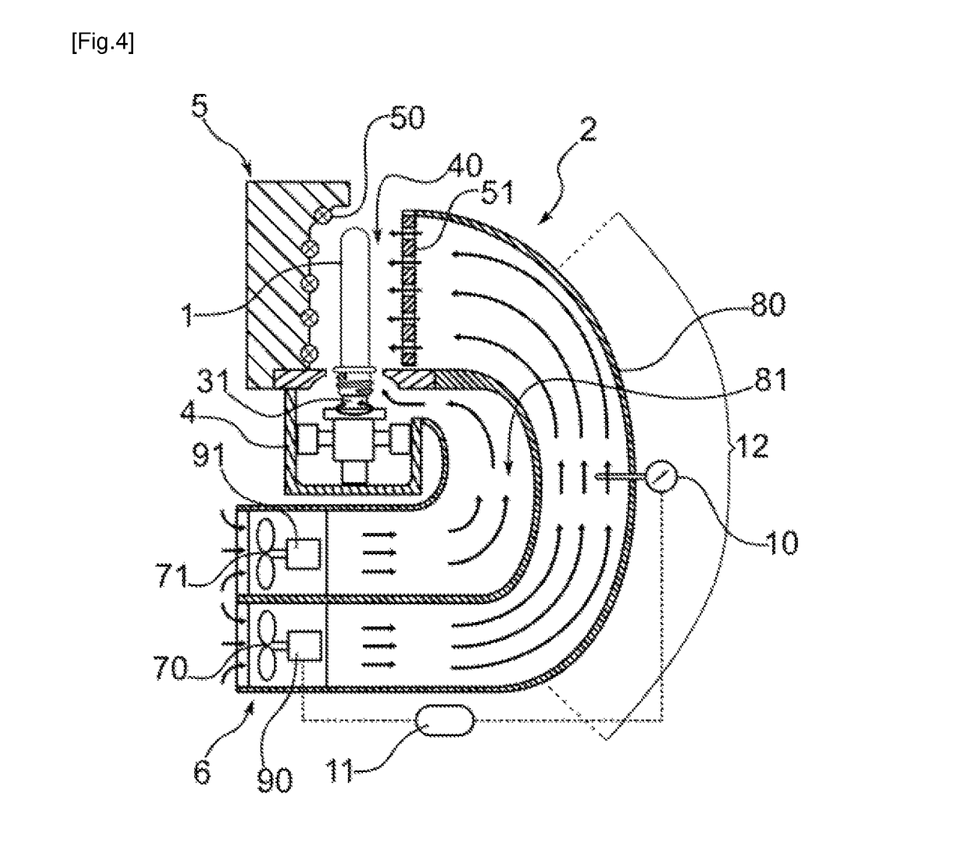
FIG. 4 schematically depicts a view, similar to FIG. 3, of a second embodiment, in particular showing two separate channels provided with their respective ventilation means, with measurement of the actual flow rate of said air flow at the center of one of said channels.
Figure 5:
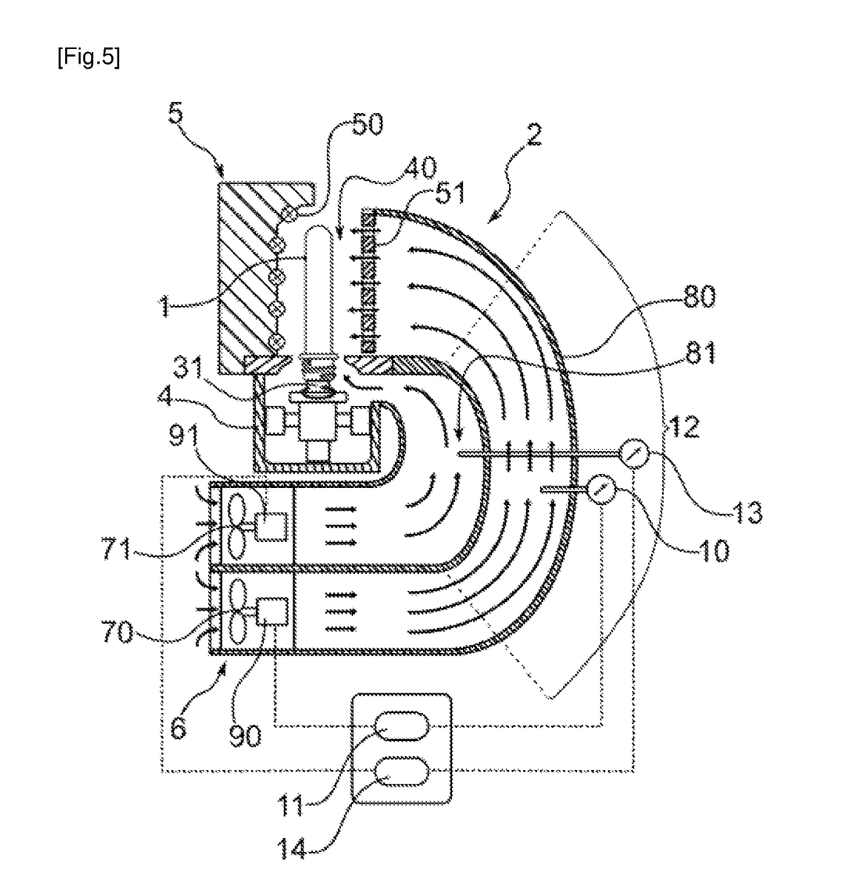
FIG. 5 schematically depicts a view, similar to FIG. 3, of a third embodiment, in particular showing two separate channels with their respective ventilation means, with measurement of the actual flow rate of said flow for each of said channels.

Preferably, as can be seen in FIGS. 4 and 5, the heating means 5 may comprise thermal radiation members, such as lamps 50, for example of the infrared type. These lamps 50 may be positioned on the inner walls of the enclosure 4.

Preferably, the lamps 50 may be situated only on one side of the enclosure 4, to the right or to the left with respect to the conveying direction of the preforms 1, in order to heat them. These laterally positioned lamps 50 allow the body 100 of the preforms 1 to be heated, in particular.

In addition, opposite the lamps 50, laterally on the opposite side, the heating means 5 may comprise reflectors 51 which can reflect back some of the heat emitted by the lamps 50.

Lamps 50 may also be disposed in the lower or upper part of the enclosure 4, facing the base 104 of the body 100 of the preforms 1.

Each heating module 3 also comprises at least one cooling means 6 oriented toward the transport volume 40. This cooling makes it possible to prevent a detrimental increase in temperature under the effect of the heating, especially of the preforms 1, but also of the various objects mentioned above. Furthermore, it is necessary to cool the mandrel 32, in order to avoid any expansion while engaging with a preform 1 and likely to deform the neck 101, or else before engagement with a preform 1 in order to avoid a situation in which this engagement is not possible.

To this end, said cooling means 6 comprises at least one circulating means 7 for circulating a flow of air.

It will be noted that the air is preferably collected at ambient temperature from outside the device 2, as can be seen in FIGS. 3 to 5. The collected air may be filtered.

In addition, the cooling means 6 comprises at least one channel 8. Such a channel 8 is generally referred to as a "duct". This channel 8 extends from said circulating means 7 as far as said enclosure 4 and leads toward said transport volume 40.

In particular, the channel 8 may be connected to the enclosure 4 at the reflectors 51, by way of suitable openings made between said reflectors 51.

Consequently, the flow of air circulates inside and along said channel 8 in order to blow the fresh air toward the enclosure 4 and toward the preforms 1 which are transported therein, especially at the level of their body 100.

The circulation of the air flow or flows is indicated by arrows in FIGS. 3 to 5.

As such, said at least one air flow is generated under the action of said at least one circulating means 7. Consequently, the flow rate of the flow varies as a function of the operating values of said circulating means 7.

Within the meaning of the invention, the flow rate corresponds to the "volumetric flow rate".

Consequently, a flow rate referred to as "nominal flow rate" is determined as a function of the operating values of said circulating means 7. These operating values may be modified by a control means 9 of said circulating means 7. Thus, it is possible to increase or reduce the nominal flow rate by modifying the control of the circulating means 7.

As such, according to one embodiment, the circulating means 7 comprises at least one fan, in particular equipped with a variable-speed drive. The control means 9 then makes it possible to manage the variable-speed drive and thus modify the rotational speed of said fan, thus influencing the nominal flow rate of the circulating flow.

In summary, the control means 9 of the circulating means 7 makes it possible to determine said nominal flow rate.

However, as mentioned above, such a nominal flow rate is only envisioned and depends on various components of the device 2, such as for example the clogging state of the filters, the good operating state of the fans, etc. This nominal flow rate is therefore susceptible to fluctuations as a function of time.

The invention provides for controlling the state of this nominal flow rate, in order to compensate for any fluctuation observed.

To this end, the device 2 comprises at least, along said at least one channel 8, at least one measuring means 10 for measuring at least one component of the actual flow rate of said air flow. In sum, the invention provides for measuring inside the channel 8 that the actual flow rate does indeed correspond to the nominal flow rate of the flow generated by the circulating means 7. It is then possible to adjust the operation of the circulating means 7 in order to compensate for a differential measured or else refine the cooling conditions.

Consequently, the device 2 also comprises an adjusting means 11 for adjusting said nominal flow rate with respect to said actual flow rate, by controlling the control means 9 of said circulating means 7. In sum, the control of the circulating means 7, for example the intensity of the variable-speed drive of each fan, is controlled such that the actual flow rate is brought as close as possible to a flow rate that is theoretically required for optimal cooling, with respect to the heating of the preforms, according to the characteristics associated with the manufacturing process. In sum, knowing the actual flow rate of the flow, it is possible to adjust the setpoint to remain within the prerequisites for the manufacture of the containers.

It will be noted that each heating module 3 comprises at least one control means 9 for controlling at least said heating means 5 and said cooling means 6. Said control means 9 allows the operation of the circulating means 7 of the cooling means 6 to be managed.

Furthermore, this control means 9 may be of any type, in the form of an electronic component such as a switch or else a variable-speed drive electrically connected to a fan. The control means 9 may also be in the form of software, executed on a computer terminal that is installed within the device 2 or remote, in particular at a central unit. What is more, the measuring means 10 may be positioned along the entire length of the channel 8. The measuring means 10 makes it possible to detect, inside the channel 8, characteristics associated with the air flow, such as its actual flow rate. According to a preferred embodiment, said measuring means 10 is positioned in a central segment 12 of the length of said channel 8. Such a segment 12, within which the measuring means 10 may be positioned, is therefore located at a distance from the circulating means 7 and also from the outlet of the channel 8 leading into the enclosure 4, in particular at the reflectors 51. This particular positioning makes it possible, in particular, to prevent the measurement of the actual flow rate carried out from being affected, for example by turbulence at the fans or the heating of the enclosure 4. By positioning the measuring means 10 along the segment 12 of the channel 8, it is then possible to obtain a measurement of the flow that is regular or approximately regular or substantially constant over time. In sum, the measuring means 10 is positioned at a selected location in the channel 8 at which the flow is stable and as homogeneous as possible. This location therefore depends on the specific configuration of said channel 8.

As mentioned above, the measurement of the actual flow rate essentially targets at least one of the components of the air flow circulating in the channel 8. It is from this component that the actual flow rate of said flow is obtained directly or by a calculation. According to one embodiment, said measuring means 10 is a speed sensor for said air flow. Said component measured is then the speed.

Such a sensor may then be an anemometer. Such an anemometer may comprise a rotary member, such as a helical anemometer, a cup anemometer referred to as a Robinson anemometer, or a windmill anemometer referred to as a Byram anemometer. Said anemometer may also be of the ultrasonic type or of the laser type. Preferably, the anemometer may be a hot-wire anemometer.

According to another embodiment, said measuring means 10 is a pressure sensor for said air flow, then resembling a manometer. Said measured component of the flow is then the pressure.

Such a sensor is then a plate-type anemometer, ball-type anemometer or tube-type anemometer referred to as a Dines anemometer. Preferably, the anemometer is of the tube type referred to as a Pitot or Pitot tube anemometer.

Other measuring means 10 may be added and envisioned, in particular in order to obtain other actual information associated with the flow, such as for example its density or its temperature.

According to a second embodiment, depicted in FIG. 4, said cooling means 6 comprises at least a first channel 80 leading into a first part of the transport volume 40 and a second channel 81 leading into a second part of the enclosure 4. In particular, the outlet of the first channel 80 may be situated facing the body 100 of the preforms 1 transported in the volume 40 of the enclosure 4, while the outlet of the second channel 81 is situated opposite the mandrel 32 and the neck 101 of the preforms 1 transported (or vice versa). The first channel 80 and the second channel 81 are therefore separate and each dedicated to targeted cooling of the enclosure 4, in particular the upper part or the lower part of the transport volume 40.

In addition, said circulating means 7 then comprises a first ventilation means 70 for ventilating a first flow with a first nominal flow rate toward said first channel 80, and also a second ventilation means 71 for ventilating a second flow with a second nominal flow rate toward said second channel 81.

In this configuration, the invention provides for only controlling the flow rate of the flow of one of the channels.

To this end, said measuring means 10 is positioned along said first channel 80. In addition, said adjusting means 11 control a first control means 90 of said first ventilation means 70.

Thus, preferably, this embodiment provides for installing a sensor in the first channel 80 leading to the body 100 of the preforms 1, and for controlling the control of the first ventilation means 70 in order to modify and compensate for any differential thus observed.

According to a third embodiment, depicted in FIG. 5, with a first channel 80 and a second channel 81, the device 2 comprises a second measuring means 13 positioned along said second channel 81. It is then possible to measure at least one component of the second flow circulating in this second channel 81, in particular targeting the neck 101 of the preforms 1, and to control it.

Consequently, the device 2 comprises a second adjusting means 14 for adjusting said second nominal flow rate with respect to said second actual flow rate, by controlling a control means 91 of said second ventilation means 71.

Thus, this embodiment allows the flows circulating along one or the other of the first channel 80 or the second channel 81 to be controlled independently.

The invention also relates to a thermal conditioning method for thermally conditioning preforms 1, hereinafter referred to as "method".

Such a method is particularly suited to implementation of the device 2 as described above.

As mentioned above, said preforms 1 comprise at least a body 100.

In general, the preforms 1 are transported within a transport volume 40, in particular inside the enclosure 4 of the heating modules 3. Consequently, said preforms 1 are heated during their passage through said volume 40.

At the same time, at least the body 100 of said preforms 1 is cooled by ventilation of at least one air flow with a nominal flow rate from a circulating means 7 toward said enclosure 4.

Furthermore, the nominal flow rate of said air flow is controlled by controlling said circulating means 7. In particular, the nominal flow rate is determined by defining an operating value applied to the circulating means 7.

Advantageously, at least one component of the actual flow rate of said air flow is measured between said enclosure 4 and said circulating means 7.

Consequently, knowing the actual flow rate, the control of said circulating means 7 is adjusted with respect to said at least one component of said actual flow rate measured.

As mentioned above, the speed or the pressure of the air flow can be measured. Preferably, at least one component of said actual flow rate is measured by detecting the speed of said air flow.

It is then possible to adjust the control of the circulating means 7 with a control carried out directly or else after a suitable conversion of the measured values, in particular a conversion from analog values originating from the sensors to digital values which can then be processed, transmitted and recorded via suitable computer means.

The control thus makes it possible to interpret and send control signals to the circulating means 7, in order to adjust the operation thereof in real time to be as close as possible to the theoretical restraints required by the manufacturing process.

Thus, the thermal conditioning of preforms 1 according to the invention, by measuring the actual state of the circulating cooling flow, makes it possible to compensate for any variations and to identify any malfunctioning of a component, such as clogging of the filters or aging of the fans.

The invention makes it possible to verify the performance of the ventilation related to the cooling, but also to identify sources of variation or of disruption which result in pressure loss between the upstream and downstream side of the channel 8.

It is then possible to output a notification to alert an operator or even to schedule specific and suitable maintenance as a function of the malfunctioning thus observed. The invention is thus predictive and anticipatory in resolving problems by identifying and locating them directly within the thermal conditioning device 2.

Similarly, the invention makes it possible to save energy, in particular by optimizing the ventilation to be as close as possible to the requirements specification of the method for shaping the container.

The invention claimed is:

1. A thermal conditioning device (2) for thermally conditioning preforms (1) made of a plastic material, comprising:
   at least one heating module (3) provided with:
      an enclosure (4) defining at least one transport volume (40) for said preforms (1);
      at least one heating device (5) oriented toward the transport volume (40) and at least one reflector (51) located opposite the at least one heating device (5);
      at least one cooling device (6) oriented toward the transport volume (40) via at least one channel (8);
      at least one control (9) for controlling at least said heating device (5) and said cooling device (6);
   wherein said cooling device (6) comprises:
      at least one circulating device (7) for circulating a flow of air through the channel to the transport volume (40) with a nominal flow rate, said nominal flow rate being determined by said control (9) of said at least one circulating device (7); and
      the at least one channel (8) extending from said circulating device (7) as far as said enclosure (4) and leading toward said transport volume (40), wherein the flow of air enters the transport volume (40) via openings in the reflectors (51);
   the thermal conditioning device (2) further comprising:
      along said channel (8), at least one measuring means (10) for measuring, in real time, at least one component of an actual flow rate of said air flow prior to entry into the transport volume (40), wherein the at least one measuring means (10) is located along the channel between the at least one circulating device (7) and the enclosure (4); and
      an adjusting means (11) for adjusting said nominal flow rate with respect to said actual flow rate of the real-time measurement, by controlling the control (9) of said circulating means (7).

2. The thermal conditioning device (2) as claimed in claim 1, wherein said measuring means (10) is a speed sensor for said air flow.

3. The thermal conditioning device (2) as claimed in claim 2, wherein said measuring means (10) is positioned in a central segment (12) of the length of said channel (8).

4. The thermal conditioning device (2) as claimed in claim 2, wherein
   said cooling device (6) comprises at least a first channel (80) leading into a first part of the transport volume (40) and a second channel (81) leading into a second part of the enclosure (4);
   said circulating means (7) comprising a first ventilation means (70) for ventilating a first flow with a first nominal flow rate toward said first channel (80) and a second ventilation means (71) for ventilating a second flow with a second nominal flow rate toward said second channel (81);
   said measuring means (10) is positioned along said first channel (80); and
   said adjusting means (11) controlling a first control means (90) of said first ventilation means (70).

5. The thermal conditioning device of claim 2, wherein the speed sensor is an anemometer.

6. The thermal conditioning device of claim 5, wherein the anemometer is selected from a Pitot tube anemometer, a hot-wire anemometer, a helical anemometer, a cup anemometer, a windmill anemometer, an ultrasonic anemometer, a laser anemometer, a plate-type anemometer, or a ball-type anemometer.

7. The thermal conditioning device (2) as claimed in claim 1, wherein
   said measuring means (10) is positioned in a central segment (12) of the length of said channel (8).

8. The thermal conditioning device (2) as claimed in claim 7, wherein said measuring means (10) is positioned in a central segment (12) of the length of said channel (8).

9. The thermal conditioning device (2) as claimed in claim 7, wherein
   said cooling device (6) comprises at least a first channel (80) leading into a first part of the transport volume (40) and a second channel (81) leading into a second part of the enclosure (4);
   said circulating means (7) comprising a first ventilation means (70) for ventilating a first flow with a first nominal flow rate toward said first channel (80) and a second ventilation means (71) for ventilating a second flow with a second nominal flow rate toward said second channel (81);
   said measuring means (10) is positioned along said first channel (80); and
   said adjusting means (11) controlling a first control means (90) of said first ventilation means (70).

10. The thermal conditioning device (2) as claimed in claim 1, wherein
    said cooling device (6) comprises at least a first channel (80) leading into a first part of the transport volume (40) and a second channel (81) leading into a second part of the enclosure (4);
    said circulating means (7) comprising a first ventilation means (70) for ventilating a first flow with a first nominal flow rate toward said first channel (80) and a second ventilation means (71) for ventilating a second flow with a second nominal flow rate toward said second channel (81);
    said measuring means (10) is positioned along said first channel (80); and
    said adjusting means (11) controlling a first control means (90) of said first ventilation means (70).

11. The thermal conditioning device (2) as claimed in claim 10, further comprising:
    a second measuring means (13) positioned along said second channel (81);

a second adjusting means (14) for adjusting said second nominal flow rate with respect to said second actual flow rate, by controlling a control means (91) of said second ventilation means (71).

12. A thermal conditioning method for thermally conditioning preforms (1) made of a plastic material, said preforms (1) comprising at least a body (100), the method comprising:

transporting preforms (1) within a transport volume (40);

heating, during passage through the transport volume (40), said preforms (1);

cooling at least the body (100) of said preforms (1) by ventilation of at least one air flow with a nominal flow rate from a circulating means (7) toward said enclosure (4);

controlling the nominal flow rate of said air flow by controlling said circulating means (7); and measuring, prior to said air flow entering the enclosure (4), at least one component of the actual flow rate of said air flow in real time between said enclosure (4) and said circulating means (7);

wherein:

the control of said circulating means (7) is adjusted with respect to said at least one component of said actual flow rate of the real-time measurement.

13. The thermal conditioning method as claimed in claim 12, wherein at least one component of said actual flow rate is measured by detecting the speed of said air flow.

* * * * *